United States Patent
Sethi et al.

(10) Patent No.: US 11,953,992 B2
(45) Date of Patent: Apr. 9, 2024

(54) DEVICE MODIFICATION ANALYSIS FRAMEWORK

(71) Applicant: Dell Products L.P., Round Rock, TX (US)

(72) Inventors: Parminder Singh Sethi, Ludhiana (IN); Durai S. Singh, Chennai (IN)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 17/848,004

(22) Filed: Jun. 23, 2022

(65) Prior Publication Data

US 2023/0418709 A1    Dec. 28, 2023

(51) Int. Cl.
| | | |
|---|---|---|
| *G06F 11/36* | (2006.01) | |
| *G06F 8/61* | (2018.01) | |
| *G06F 11/07* | (2006.01) | |
| *G06F 11/14* | (2006.01) | |
| *G06N 20/00* | (2019.01) | |

(52) U.S. Cl.
CPC .............. *G06F 11/142* (2013.01); *G06F 8/61* (2013.01); *G06F 11/0772* (2013.01); *G06F 11/3688* (2013.01); *G06F 11/3692* (2013.01); *G06N 20/00* (2019.01)

(58) Field of Classification Search
CPC ....... H04L 67/561; H04L 49/70; H04L 69/22; H04L 69/324; G06F 11/142; G06F 8/61; G06F 11/0772; G06F 11/3688; G06F 11/3692; G06N 20/00
USPC .......................................................... 714/1
See application file for complete search history.

(56) References Cited

U.S. PATENT DOCUMENTS

| | | | | |
|---|---|---|---|---|
| 7,020,697 | B1* | 3/2006 | Goodman | G06Q 10/06 714/1 |
| 8,392,902 | B2* | 3/2013 | Reinz | G16H 40/40 718/1 |
| 9,560,120 | B1* | 1/2017 | Allen | G06F 8/658 |
| 10,678,666 | B1* | 6/2020 | Gauf | G06F 11/2635 |
| 11,483,218 | B2* | 10/2022 | Al-Dulaimi | H04L 41/12 |
| 2002/0138158 | A1* | 9/2002 | Landreth | G05B 15/02 714/1 |
| 2004/0153689 | A1* | 8/2004 | Assaf | G06F 11/0787 714/E11.204 |

(Continued)

OTHER PUBLICATIONS

Tech Target, "What is Hibernate?" https://www.theserverside.com/definition/Hibernate#:~:text=Hibernate%20is%20an%20open%20source,relational%20databases%20for%20web%20applications. Oct. 2021, 4 pages.

(Continued)

*Primary Examiner* — Guy J Lamarre
*Assistant Examiner* — Enam Ahmed
(74) *Attorney, Agent, or Firm* — Ryan, Mason & Lewis, LLP (57) ABSTRACT

Techniques for device modification analysis are disclosed. For example, a method comprises collecting operational data from one or more devices, and receiving one or more modifications to at least one of firmware and software for the one or more devices. In the method, one or more virtual instances of respective ones of the one or more devices are generated, and the one or more modifications are tested on the one or more virtual instances to determine if there are one or more issues with the one or more modifications.

20 Claims, 6 Drawing Sheets

(56) References Cited

U.S. PATENT DOCUMENTS

| | | | | |
|---|---|---|---|---|
| 2013/0124932 A1* | 5/2013 | Schuh | ................... | G11C 29/16 |
| | | | | 714/718 |
| 2015/0309813 A1* | 10/2015 | Patel | ................... | G06F 21/577 |
| | | | | 703/22 |
| 2018/0307585 A1* | 10/2018 | Mulder | ................... | G06F 3/067 |

OTHER PUBLICATIONS

Wikipedia, "Hibernate (framework)" https://en.wikipedia.org/wiki/Hibernate_(framework), Jun. 15, 2022, 7 pages.

Mvian, "How to Fix Yellow Exclamation Mark Issue in Device Manager," https://www.wisecleaner.com/how-to/106-how-to-fix-yellow-exclamation-mark-issue-in-device-manager.html, Nov. 2, 2017, 4 pages.

Dell Technologies, "What is BIOS and How to Update the BIOS on Your Dell System," https://www.dell.com/support/kbdoc/en-my/000129365/what-is-bios-and-how-to-update-the-bios-on-your-dell-system#:~: text=BIOS%20update%20contains%20feature%20enhancements,self%2Dinstalling%20BIOS%20update%20utility. Mar. 14, 2022, 5 pages.

\* cited by examiner

DEVICE MODIFICATION ANALYSIS FRAMEWORK

FIELD

The field relates generally to information processing systems, and more particularly to a framework for analysis of potential device modifications.

BACKGROUND

Device software and/or firmware modifications (e.g., updates and/or upgrades) can, for example, provide feature enhancements, fix security issues or bugs, improve compatibility with different devices or applications, improve stability, remove outdated features and/or improve overall device performance. Although software and/or firmware modifications may be automatically installed on some devices, the modifications may fail to install on many of the devices. Such installation failures can lead to system vulnerabilities, malfunctions and other types of degraded performance.

SUMMARY

Embodiments provide a device modification analysis platform in an information processing system.

For example, in one embodiment, a method comprises collecting operational data from one or more devices, and receiving one or more modifications to at least one of firmware and software for the one or more devices. In the method, one or more virtual instances of respective ones of the one or more devices are generated, and the one or more modifications are tested on the one or more virtual instances to determine if there are one or more issues with the one or more modifications.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "software" refers to one or more computer programs executed by a processor of a processing device. Software may include, for example, application software and system software. Application software performs functions beyond the operation of the computer itself. System software manages hardware behavior and provides functionalities for other software to run properly (e.g., platforms for running application software). System software can include, for example, device drivers, utilities and/or operating systems including, for example, supervisory programs, boot loaders, shells and window systems.

As used herein, "firmware" refers to a class of computer software that controls specific hardware of a device. Firmware can provide the basic functions of a device, and may provide hardware abstraction services to higher-level software such as operating systems. Non-limiting examples of devices including embedded firmware are home and personal-use appliances, computers and computer peripherals (e.g., printers, keyboards, etc.). A non-limiting example of firmware is a basic input-output system (BIOS) of a computer, which includes a program that starts a computer system after it is powered on, and manages data flow between a computer's operating system and attached devices, such as, for example, a hard disk, video adapter, keyboard, mouse and printer. The BIOS can be embedded on a memory chip on a system board or motherboard of a computer, and function as an interface between a computer's hardware and the operating system.

As used herein, an "update" (e.g., software or firmware update) refers to a change (e.g., improvement) to an existing program (e.g., software or firmware), which builds on the existing program. For example, an update provides fixes for features that may not be working as intended and/or add enhancements (e.g., compatibility and security enhancement) for a current software or firmware version.

As used herein, an "upgrade" (e.g., software or firmware upgrade) refers to a new program with changed and/or or new functionality, which supersedes the previous product (e.g., software or firmware). For example, an upgrade provides a new software or firmware version.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "component" is to be broadly construed, and can refer to various parts, hardware components and/or software components such as, but not necessarily limited to, storage devices (e.g., hard disk drives), batteries, chassis, display panels, motherboards, central processing units (CPUs), controllers, cards, heat sinks, fans, fan assemblies, processors, ports, port connectors, host bus adaptors (HBAs), speakers, keyboards, memories, servers, switches, sensors, buses (e.g., serial buses), networks or other elements of a computing environment.

Figure 1:
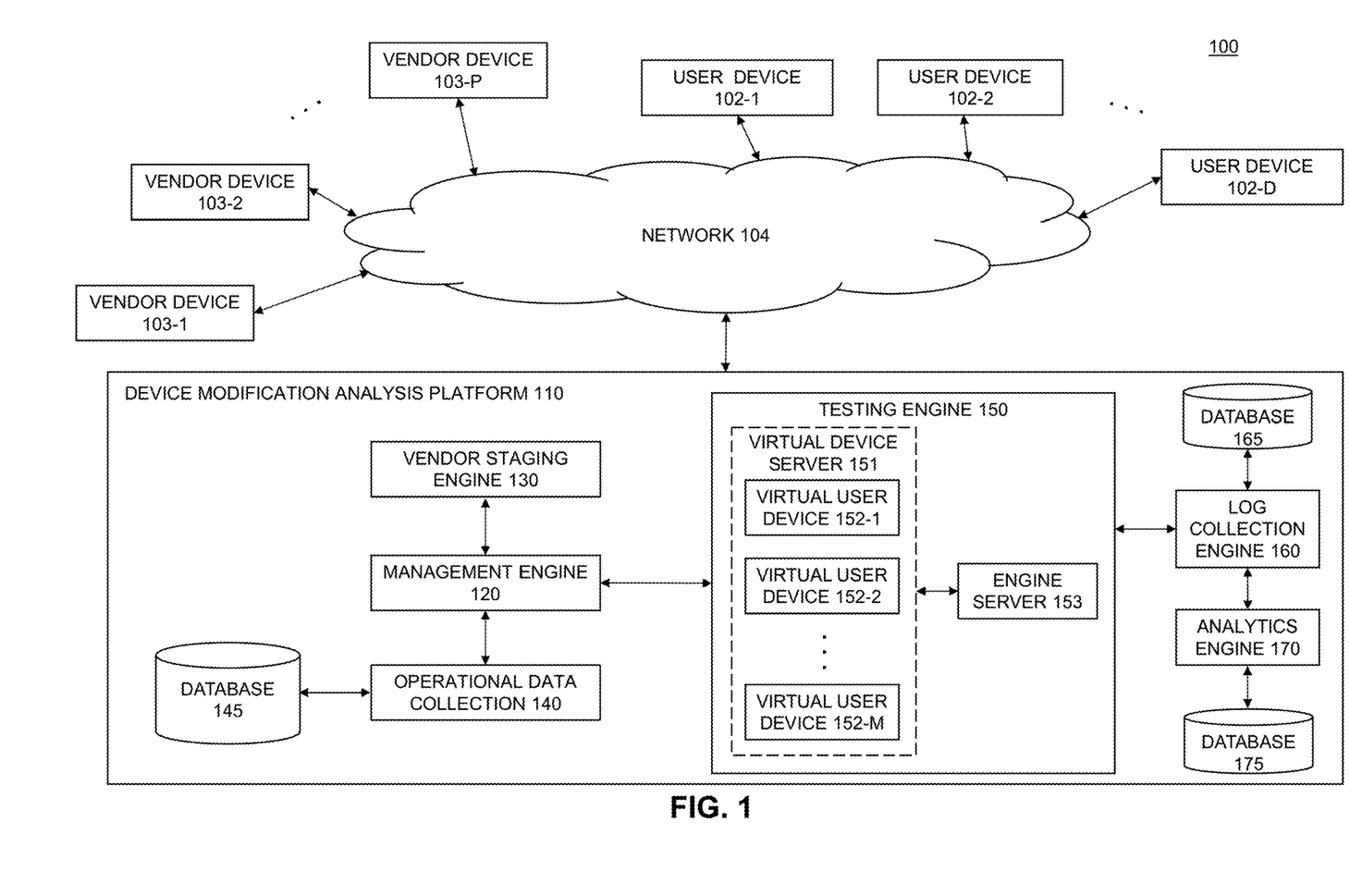
FIG. 1 depicts an information processing system with a device modification analysis platform for predicting outcomes of software and/or firmware modifications in an illustrative embodiment.

FIG. 1 shows an information processing system 100 configured in accordance with an illustrative embodiment. The information processing system 100 comprises user devices 102-1, 102-2, ... 102-D (collectively "user devices 102") and vendor devices 103-1, 103-2, ... 103-P (collectively "vendor devices 103"). The user devices 102 and vendor devices 103 communicate over a network 104 with a device modification analysis platform 110. The variables D and P and other similar index variables herein such as K, L and M are assumed to be arbitrary positive integers greater than or equal to one.

The user devices 102 and vendor devices 103 can comprise, for example, desktop, laptop or tablet computers, servers, host devices, storage devices, mobile telephones, Internet of Things (IoT) devices or other types of processing devices capable of communicating with the device modification analysis platform 110 over the network 104. Such devices are examples of what are more generally referred to herein as "processing devices." Some of these processing devices are also generally referred to herein as "computers." The user devices 102 and vendor devices 103 may also or alternately comprise virtualized computing resources, such as virtual machines (VMs), containers, etc. The user devices 102 and/or vendor devices 103 in some embodiments comprise respective computers associated with a particular company, organization or other enterprise. It is to be understood that although the embodiments are discussed in terms of user devices 102 (e.g., customer or client devices) and vendor devices 103 (e.g., devices corresponding to software and/or firmware vendors), the embodiments are not necessarily limited thereto, and may be applied to different devices (e.g., edge or cloud devices).

The terms "user" or "administrator" herein are intended to be broadly construed so as to encompass numerous arrangements of human, hardware, software or firmware entities, as well as combinations of such entities. Device modification analysis services may be provided for users utilizing one or more machine learning models, although it is to be appreciated that other types of infrastructure arrangements could be used. At least a portion of the available services and functionalities provided by the device modification analysis platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the device modification analysis platform 110, as well as to support communication between the device modification analysis platform 110 and connected devices (e.g., user devices 102 and vendor devices 103) and/or other related systems and devices not explicitly shown.

In some embodiments, the user devices 102 and/or vendor devices 103 are assumed to be associated with repair and/or support technicians, system administrators, information technology (IT) managers, software developers, release management personnel or other authorized personnel configured to access and utilize the device modification analysis platform 110.

As noted above in the background section, device updates and/or upgrades can provide benefits such as, but not necessarily limited to, feature enhancements, fixes for security issues and bugs, and better compatibility with different devices and/or applications. However, the updates and/or upgrades may to fail to install on some devices for a number of reasons including, but not necessarily limited to, operating system incompatibility, software or firmware version incompatibility, missing dependencies (e.g., shared libraries, listening ports, protocols, etc.), insufficient memory and/or access issues (e.g., a lack of authorization to install an update and/or upgrade on a given device).

With conventional approaches, software and/or firmware updates and/or upgrades may be released by several vendors (e.g., providers of software and/or firmware). When these updates and/or upgrades are pushed to the target devices, the updates and/or upgrades may not install, and the vendor or other pushing entity is not aware if the pushed update and/or upgrade was successfully installed on the target device.

The embodiments provide technical solutions which determine whether software and/or firmware modifications will be successful. Advantageously, the embodiments proactively determine if an upgrade or update will be successful prior to pushing such modifications to a physical device. For example, illustrative embodiments provide a predictive and proactive framework for software and/or firmware modification issues. The framework collects operational data from devices corresponding to their software and hardware configurations, and generates virtual instances of the devices. The device virtual instances are used to test whether modifications to the devices will be successfully installed or whether there will be problems with the installations.

The device modification analysis platform 110 in the present embodiment is assumed to be accessible to the user devices 102 and vendor devices 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the device modification analysis platform 110 includes a management engine 120, a vendor staging engine 130, an operational data collection engine 140, a database 145, a testing engine 150, a log collection engine 160, a database 165, an analytics engine 170 and a database 175. The testing engine 150 includes a virtual device server 151 comprising virtual user devices 152-1, 152-2, . . . 152-M (collectively "virtual user devices 152") and an engine server 153.

The management engine 120 functions as an interface between the user devices 102 (e.g., personal computers (PCs) or other devices) and the device modification analysis platform 110. The user devices 102 comprise physical devices where the updates and/or upgrades from vendors, supplied via vendor devices 103, are to be installed. The management engine 120 manages the collection of operational data information by the operational data collection engine 140 from the user devices 102. The collection of operational data information may be performed at designated intervals (e.g., periodic intervals). The operational data collection engine 140 and corresponding database 145 function as a repository for the operational data collected from the user devices 102. The operational data comprises, for example, hardware, software and/or firmware configuration information of the user devices 102. The hardware, software and firmware configuration information may comprise, for example, universally unique identifiers (UUIDs) or other identifiers of device components, operating system type and/or version, current software and/or firmware types and/or versions, software dependencies (e.g., shared libraries, listening ports, protocols, etc.) used by the devices, corresponding peripheral devices, available memory and permissions.

Based on, for example, the hardware, software and/or firmware configurations and/or installed applications on respective ones of the user devices 102, the management engine 120 subscribes to and creates a catalog of applicable upgrades and/or updates for each of the user devices 102. The subscription may be to applicable upgrades and/or updates supplied from vendors via vendor devices 103. The management engine 120 communicates with the testing engine 150 and, based, at least in part, on the results of the testing, coordinates pushing of software and/or firmware modifications to the user devices 102.

The testing engine 150, utilizing an engine server 153, is configured to create at least one virtual device server 151 comprising respective virtual user devices 152-1, 152-2, . . . 152-M, which are based on corresponding hardware, software and/or firmware configurations of the respective ones of the user devices 102. The testing engine 150 tests software and/or firmware modifications on the created virtual user devices 152 to determine whether such modifications will be successful on the actual user devices 102.

A log collection engine 160 collects event logs of operations in the testing engine 150, and an analytics engine 170 analyzes issues that are detected in the testing engine 150. The issues comprise, for example, upgrade and/or update installation failures on the virtual user devices 152, missing drivers and/or incorrectly installed drivers on the virtual user devices 152, full system failures of the virtual user devices 152 during and/or following the execution of an installation operation of an upgrade and/or update, and an increase in application crashes on the virtual user devices 152 during and/or following the execution of an installation operation of an upgrade and/or update.

The analytics engine 170 identifies the most common issues, and sends information back to the testing engine 150 regarding the common upgrade and/or update installation issues. Based on the identified common issues, the testing engine 150 generates tests which address the common issues before less likely causes of upgrade and/or update installation issues. As a result, the testing engine 150 is able to decrease the time to identify reasons for a failure to install or resulting problems following installation of a software and/or firmware modification.

The vendor staging engine 130 comprises one or more servers where the latest updates and/or upgrades from different vendors are staged before they are pushed by the management engine 120 to the testing engine 150 and/or the to the user devices 102. The vendors corresponding to the vendor devices 103 comprise respective entities that develop and provide system software, firmware, etc. and their corresponding updates and/or upgrades. The vendor staging engine 130 receives the latest updates and/or upgrades from different vendors via their corresponding vendor devices 103.

According to illustrative embodiments, analysis and subsequent possible installation of software and/or firmware modifications, as well as notifications about potential software and/or firmware modification issues can be accomplished in three phases.

Phase 1 corresponds to update and/or upgrade subscriptions. In phase 1, the user devices 102 share operational data information with the management engine 120. Based on the hardware, software, firmware and other configurations of the user devices 102, the management engine 120 will subscribe to applicable upgrades and/or updates for respective ones of the user devices 102. For example, in one or more embodiments, when the vendors create an upgrade and/or update, the management engine 120 will receive a notification about the upgrade and/or update. The management engine 120 generates a catalog of the applicable upgrades and/or updates which will be used in phase 2 to determine which upgrades and/or updates get pushed to which of the virtual user devices 152. The management engine 120 regularly inventories the vendor staging engine 130 to determine if new updates and/or upgrades are available. If new updates and/or upgrades are available, the management engine 120 updates the catalog of the applicable upgrades and/or updates.

Phase 2 corresponds to proactive detection of update and/or upgrade installation success or failures, and of other update and/or upgrade issues. In illustrative embodiments, the testing engine 150 simulates installation of updates and/or upgrades on the virtual user devices 152 to determine whether the updates and/or upgrades will be successful. Available upgrades and/or updates are tested on those virtual user devices 152 which correspond to certain ones of the user devices 102 that are due to receive the available upgrades and/or updates. The virtual user devices 152 (also referred to herein as "virtual instances of the devices" or "virtual device instances") have matching hardware, firmware and software configurations to those of the user devices 102 and are created based on the operational data information of the user devices 102 made available to the management engine 120.

In some embodiments, a given one of the virtual user devices 152 corresponding to a given one of the user devices 102 is created when necessary to test applicable upgrades and/or updates for the given user device 102. Once testing is completed, the given one of the virtual user devices 152 is deactivated and all or part of the virtual device firmware in the virtual device server 151 is restored to default firmware settings, returning at least part of the virtual device server 151 to its initial state. This ensures that the virtual device server 151 is ready for the creation of new virtual user devices 152 and subsequent testing of new upgrades and/or updates that may correspond to different ones of the user devices 102.

The tests that are performed in the testing engine 150 to detect potential failures or issues with the upgrades and/or updates include, but are not necessarily limited to: (i) checking performance parameters of the system corresponding to Hibernate® objective relational mapping, as well as full boot, fast startup, file handling and memory footprint operations; (ii) checking the properties of the device manager for missing drivers or drivers not being installed correctly; (iii) longevity testing to check that there are no full system failures at the kernel level (e.g., blue screen of death (BSOD) errors); and (iv) checking that there are no observed increases in application crashes.

The log collection engine 160 will gather various logs depending on the update and/or upgrade attempted on a virtual user device 152. For example, for firmware update and/or upgrade failures, the log collection engine 160 will collect logs from a data collection service (e.g., SupportAssist Enterprise available from Dell Technologies), for driver update and/or upgrade failures, the log collection engine 160 will collect operating system logs, for compatibility issues between components, the log collection engine 160 will collect data collection service and operating system logs, and for breaks in functionality of a component, the log collection engine 160 will collect operating system logs. The collected logs are stored in database 165 and are sent to the corresponding vendors via, for example, vendor devices 103, to enable the vendors to analyze the failures. For example, in illustrative embodiments, when a test indicates an update and/or upgrade failure, the log collection engine 160 will send information about a given failure to a corresponding vendor. The information includes, for example, the type of test, test request parameters (e.g., defined by the vendor), and test error parameters (e.g., reason for installation failure, issues as a result of the installation or attempted installation). For example, the test error parameters may specify a missing driver from and/or incorrect installation of a driver on one or more virtual user devices 152, a full system failure of one or more virtual user devices 152 during and/or following the execution of an installation of the update and/or upgrade and/or an increase in application crashes on one or more virtual user devices 152 during and/or following the execution of an installation of the update and/or upgrade. Test error parameters may also include one or more performance parameters of the virtual user devices 152, which may be collected during and/or following the execution of an installation of the update and/or upgrade. The one or more performance parameters correspond to, for example, objective relational mapping, full boot operations, fast startup operations, file handling operations and memory footprint operations, for which there may be, for example, delays exceeding a designated threshold, failures to execute such operations and/or incomplete execution of such operations.

Figure 2:
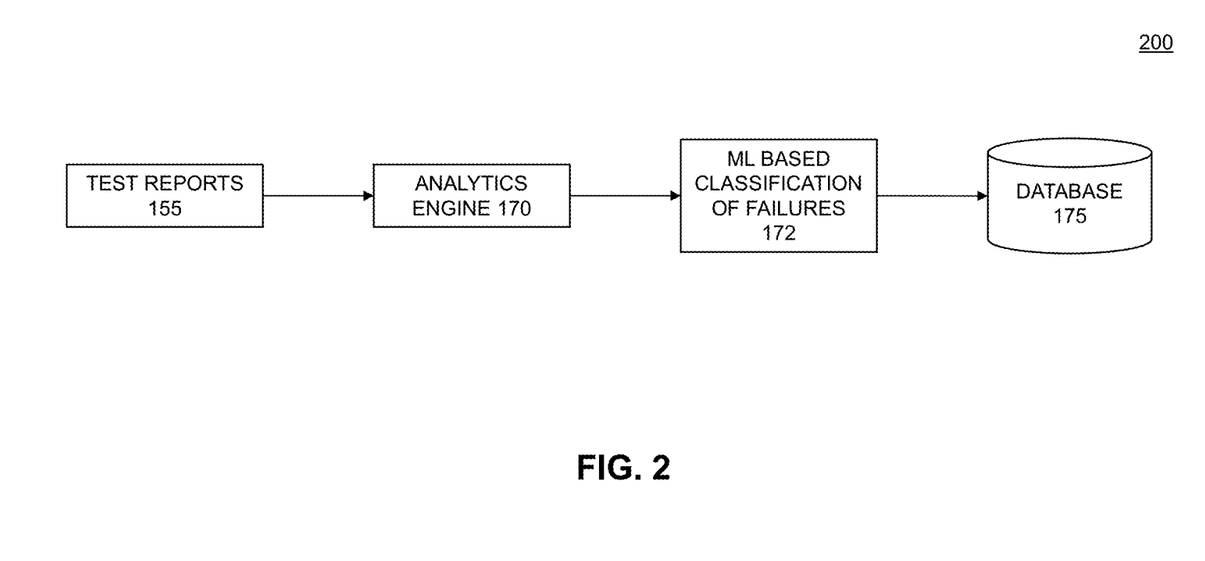
FIG. 2 depicts an operational flow for classification of failure test results in an illustrative embodiment.

Referring to the operational flow 200 in FIG. 2, in an illustrative embodiment, the information about failures is also sent to the analytics engine 170 as, for example, test reports 155 comprising, for example, the type of test, test request parameters, and test error parameters. The analytics engine 170 performs machine learning (ML) based classification of failures 172. In more detail, a machine learning-based classification algorithm categorizes the failure test results based on the reasons for the update and/or upgrade failures and/or unwanted issues resulting from the updates and/or upgrades (e.g., missing driver, problems with boot, startup or other operations, or other test error parameters noted herein above). The categorized test results are stored in a database 175.

In illustrative embodiments, each time a test is executed on a virtual user device 152 and is identified as a failure (e.g., an upgrade and/or update fails to install and/or causes an issue), a count of its corresponding category (e.g., reason for installation failure, issues as a result of the installation or attempted installation) will increase by one. This count is used by the analytics engine 170 to determine a sequence in which the tests should be executed. In more detail, if the count of a given failure category is more than the count of other failure categories, the analytics engine 170 determines that there is a high probability that failure of future upgrades and/or updates may be due to the reason for failure associated with the given failure category. As a result, the testing engine 150 prioritizes testing for the categories having the higher counts. In a non-limiting operational example, the count of failures associated with a missing driver may be more than the count of failures associated with boot operation issues. Accordingly, in this scenario, the analytics engine 170 determines that there is a high probability that failure of future upgrades and/or updates may be due to missing drivers, and prioritizes testing based on missing drivers over testing based on whether issues with boot operations will occur. The testing engine 150 performs tests based on the higher priority testing categories (i.e., the categories more likely to result in failure), thereby enabling quicker and more streamlined detection of failures and the reason for the failures.

Figure 3:
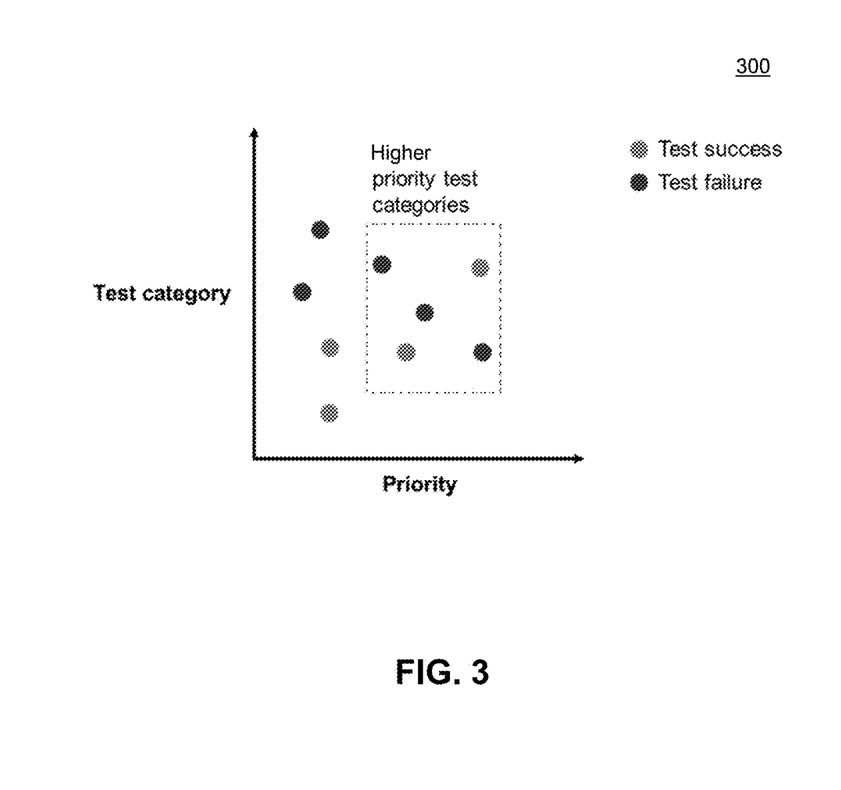
FIG. 3 depicts a graph illustrating priority outputs of test categories in an illustrative embodiment.

The graph 300 in FIG. 3 is an example of the output of the computed priority of each test category. For example, referring to the graph 300, certain ones of the categories where a failure has been identified ("Test failure") have higher priorities (increasing in right direction along the horizontal axis) than other categories where a failure has been identified. The higher priority test categories have higher counts than lower priority test categories. The graph 300 also shows certain ones of the categories where a success (e.g., an upgrade and/or update successfully installs and there are no resulting issues) has been identified ("Test success") and have higher priorities than other categories where a success has been identified. In some embodiments, similar to the failure categories, each time a test is executed on a virtual user device 152 and is identified as a success, a count of its corresponding category (e.g., reason for installation success) will increase by one. In addition to or as an alternative to the count of failure categories, the count of success categories may be used by the analytics engine 170 to determine a sequence in which the tests should be executed. In more detail, similar to the failure categories, if the count of a given success category is more than the count of other success categories, the analytics engine 170 determines that there is a high probability that success of future upgrades and/or updates may be due to the reason for success associated with the given success category. As a result, the testing engine 150 prioritizes testing for the success categories having the higher counts.

As can be understood, the testing sequence can be based on the counts of the failure categories without considering the success categories, on the counts of the success categories without considering the failure categories or on a combination of the counts of the failure and success categories. The priority of tests may change based on the results of each test category over a designated time period. As noted above, in connection with the failure categories, the priority is used to determine which test(s) are most likely to fail in the future, and those tests are executed first in future validation operations.

In accordance with illustrative embodiments, in phase 2, the management engine 120 requests from the vendor staging engine 130, the latest updates and/or upgrades to be tested. The management engine 120 notifies the testing engine 150 to deploy corresponding virtual user devices 152 to test the upgrades and/or updates. The testing engine 150 deploys the virtual user devices 152 by replicating the environment (e.g., hardware, software and firmware configurations) of the particular ones of the user devices 102 that are to receive the upgrades and/or updates.

The vendor staging engine 130 sends the updates and/or upgrades to the corresponding virtual user devices 152 for testing, and the results of the testing are logged by the log collection engine 160. In illustrative embodiments, if failures are detected, the test data is sent to the analytics engine 170 for categorization and prioritization of the tests, and the failure logs are shared with the application vendors via the vendor devices 103.

In phase 3, updates and/or upgrades are pushed to target user devices 102 via, for example, the management engine 120. The management engine 120 will push to the target user devices 102 updates and/or upgrades that have been determined to be successful on the corresponding virtual user devices 152, which are virtual instances of the target user devices 102. In one or more embodiments, after a test has been determined to be successful, a virtual device server 151 and/or a virtual user device 152 corresponding to the successful upgrade and/or update installation will be deactivated and virtual device firmware will be restored to base firmware. As a result, virtual environments revert to their initial states, ensuring that virtual environments are ready for testing of subsequent upgrades and/or updates. If an installation of an update and/or upgrade is not successfully installed on a virtual user device 152 in phase 2, or is otherwise determined to be a failure, the management engine 120 notifies users of the user devices 102 about the problems with the availability of the update and/or upgrade, and about available software or firmware dependencies that may enable installation and/or about alternate methods by which the user can install the upgrade and/or update.

According to one or more embodiments, the databases 145, 165 and 175 and other data repositories or databases referred to herein can be configured according to a relational database management system (RDBMS) (e.g., PostgreSQL). In some embodiments the databases 145, 165 and 175 and other data repositories or databases referred to herein are implemented using one or more storage systems or devices associated with the device modification analysis platform 110. In some embodiments, one or more of the storage systems utilized to implement the databases 145, 165 and 175 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the device modification analysis platform 110, the management engine 120, vendor staging engine 130, operational data collection engine 140, database 145, testing engine 150, log collection engine 160, database 165, analytics engine 170 and/or database 175 in other embodiments can be implemented at least in part externally to the device modification analysis platform 110, for example, as stand-alone servers, sets of servers or other types of systems coupled to the network 104. For example, the management engine 120, vendor staging engine 130, operational data collection engine 140, database 145, testing engine 150, log collection engine 160, database 165, analytics engine 170 and/or database 175 may be provided as cloud services accessible by the device modification analysis platform 110.

The management engine 120, vendor staging engine 130, operational data collection engine 140, database 145, testing engine 150, log collection engine 160, database 165, analytics engine 170 and/or database 175 in the FIG. 1 embodiment are each assumed to be implemented using at least one processing device. Each such processing device generally comprises at least one processor and an associated memory, and implements one or more functional modules for controlling certain features of the management engine 120, vendor staging engine 130, operational data collection engine 140, database 145, testing engine 150, log collection engine 160, database 165, analytics engine 170 and/or database 175.

At least portions of the device modification analysis platform 110 and the elements thereof may be implemented at least in part in the form of software that is stored in memory and executed by a processor. The device modification analysis platform 110 and the elements thereof comprise further hardware and software required for running the device modification analysis platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the management engine 120, vendor staging engine 130, operational data collection engine 140, database 145, testing engine 150, log collection engine 160, database 165, analytics engine 170, database 175 and other elements of the device modification analysis platform 110 in the present embodiment are shown as part of the device modification analysis platform 110, at least a portion of the management engine 120, vendor staging engine 130, operational data collection engine 140, database 145, testing engine 150, log collection engine 160, database 165, analytics engine 170, database 175 and other elements of the device modification analysis platform 110 in other embodiments may be implemented on one or more other processing platforms that are accessible to the device modification analysis platform 110 over one or more networks. Such elements can each be implemented at least in part within another system element or at least in part utilizing one or more stand-alone elements coupled to the network 104.

It is assumed that the device modification analysis platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the management engine 120, vendor staging engine 130, operational data collection engine 140, database 145, testing engine 150, log collection engine 160, database 165, analytics engine 170, database 175 and other elements of the device modification analysis platform 110, and the elements thereof can each be implemented in the form of one or more LXCs running on one or more VMs. Other arrangements of one or more processing devices of a processing platform can be used to implement the management engine 120, vendor staging engine 130, operational data collection engine 140, database 145, testing engine 150, log collection engine 160, database 165, analytics engine 170 and database 175, as well as other elements of the device modification analysis platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the device modification analysis platform 110 to reside in different data centers. Numerous other distributed implementations of the device modification analysis platform 110 are possible.

Accordingly, one or each of the management engine 120, vendor staging engine 130, operational data collection engine 140, database 145, testing engine 150, log collection engine 160, database 165, analytics engine 170, database 175 and other elements of the device modification analysis platform 110 can each be implemented in a distributed manner so as to comprise a plurality of distributed elements implemented on respective ones of a plurality of compute nodes of the device modification analysis platform 110.

It is to be appreciated that these and other features of illustrative embodiments are presented by way of example only, and should not be construed as limiting in any way.

Accordingly, different numbers, types and arrangements of system elements such as the management engine 120, vendor staging engine 130, operational data collection engine 140, database 145, testing engine 150, log collection engine 160, database 165, analytics engine 170, database 175 and other elements of the device modification analysis platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the device modification analysis platform can be offered to cloud infrastructure customers or other users as part of FaaS, CaaS and/or PaaS offerings.

Figure 4:
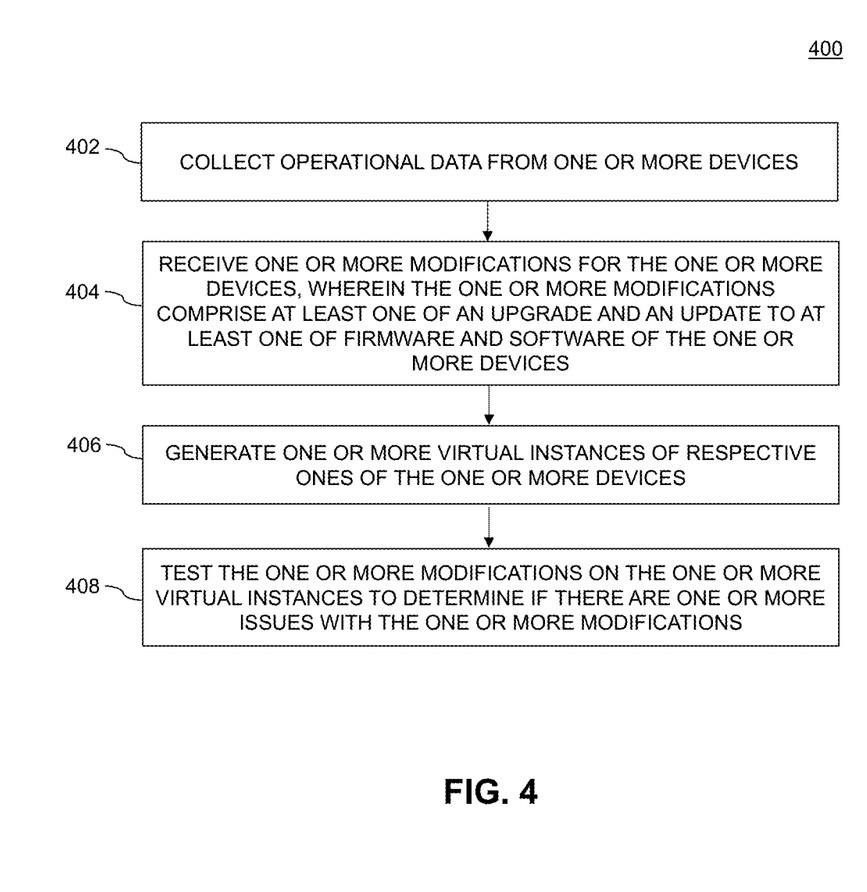
FIG. 4 depicts a process for predicting outcomes of software and/or firmware modifications in an illustrative embodiment.

The operation of the information processing system 100 will now be described in further detail with reference to the flow diagram of FIG. 4. With reference to FIG. 4, a process 400 for device modification analysis for predicting outcomes of software and/or firmware modifications as shown includes steps 402 through 408, and is suitable for use in the system 100 but is more generally applicable to other types of information processing systems comprising a device modification analysis platform configured for device modification analysis.

In step 402, operational data is collected from one or more devices (e.g., user devices 102). The operational data comprises, for example, at least one of hardware configuration data, software configuration data and firmware configuration data.

In step 404, one or more modifications for the one or more devices are received. The one or more modifications comprise at least one of an upgrade and an update to at least one of firmware and software of the one or more devices. The applicability of the one or more modifications to the respective ones of the one or more devices is determined based, at least in part, on the operational data.

In step 406, one or more virtual instances (e.g., virtual user devices 152) of respective ones of the one or more devices are generated. In step 408, the one or more modifications are tested on the one or more virtual instances to determine if there are one or more issues with the one or more modifications. In illustrative embodiments, the testing of the one or more modifications comprises executing an installation operation of the one or more modifications on the one or more virtual instances. The testing of the one or more modifications further comprises determining whether the installation operation of the one or more modifications on the one or more virtual instances is able to be completed.

In one or more embodiments, the testing of the one or more modifications further comprises analyzing one or more performance parameters of the one or more virtual instances at least one of during and following the execution of the installation operation. The one or more performance parameters correspond to at least one of objective relational mapping, full boot operations, fast startup operations, file handling operations and memory footprint operations.

According to one or more embodiments, the one or more issues comprise at least one of: (i) a missing driver from the one or more virtual instances; (ii) incorrect installation of a driver on the one or more virtual instances; (iii) a full system failure of the one or more virtual instances at least one of during and following the execution of the installation operation; and (iv) an increase in application crashes on the one or more virtual instances at least one of during and following the execution of the installation operation. One or more logs of the execution of the installation operation are collected and transmitted to suppliers (e.g., vendors) of the one or more modifications.

In illustrative embodiments, one or more reports of the testing are generated, and the one or more reports are analyzed using one or more machine learning algorithms to classify the one or more issues. A ranking of a plurality of different classified issues is generated from repeated instances of the testing of a plurality of the modifications on a plurality of the virtual instances. The ranking is based on a frequency of occurrence (e.g., counts) of the respective ones of the different classified issues. Operations for the testing are prioritized to test for higher frequency classified issues before lower frequency classified issues.

In accordance with one or more embodiments, in response to a determination of a lack of issues with the one or more modifications, the one or more modifications are pushed to the one or more devices. In response to a determination of issues with the one or more modifications, a notification for the one or more devices is generated. The notification indicates at least one of the presence of one or more issues with the one or more modifications and one or more available dependencies for removing the one or more issues.

It is to be appreciated that the FIG. 4 process and other features and functionality described above can be adapted for use with other types of information systems configured to execute device modification analysis services in a device modification analysis platform or other type of platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a device modification analysis platform as disclosed herein can provide a number of significant advantages relative to conventional arrangements. For example, the device modification analysis platform proactively detects device upgrade and/or update issues, without deploying the updates and/or upgrades on the physical user devices. By running a series of simulations on virtual instances of the user devices, the embodiments proactively determine if the upgrades and/or updates will be successful before the upgrades and/or updates are pushed to the physical user devices. The embodiments provide technical solutions that utilize available operational data to automatically create virtual device instances that replicate the environments of physical user devices.

As an additional advantage, the embodiments provide technical solutions which prioritize which upgrade and/or update tests are performed first based on analysis of historical results. The tests that are used to determine the success or failure of an upgrade and/or update on target user devices are prioritized based on learning from previous validations which categories of tests are more likely to result in installation issues. The tests which result in more installation issues than other tests are performed first in an effort to find installation issues in less time. The priority of the test types is dynamic based on changing test results over a designated time period.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the device modification analysis platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a device modification analysis platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
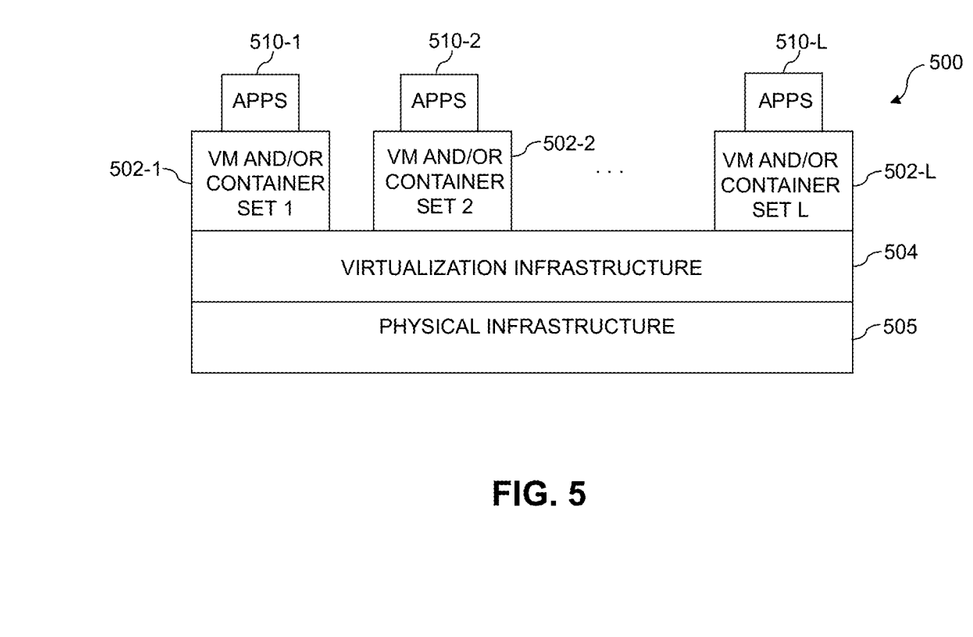
FIGS. 5 and 6 show examples of processing platforms that may be utilized to implement at least a portion of an information processing system according to illustrative embodiments.
Figure 6:
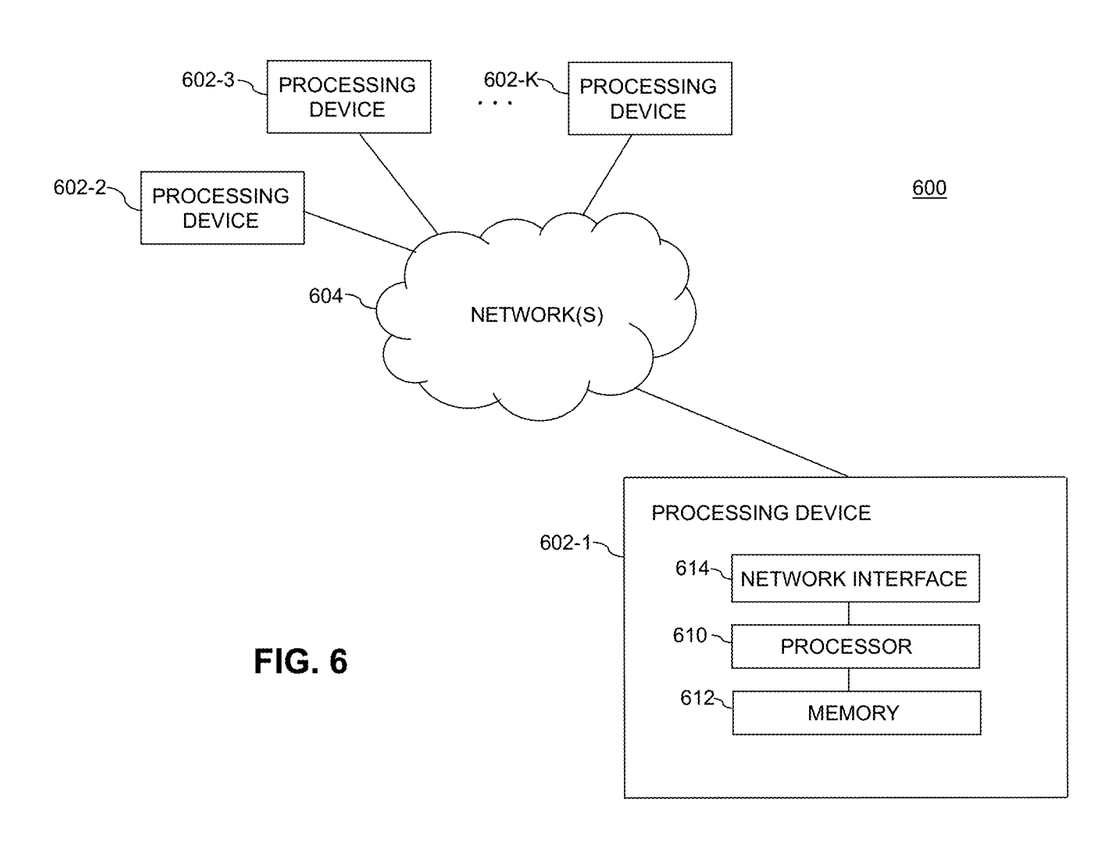

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the device modification analysis platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and device modification analysis platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
collecting operational data from one or more user devices;
receiving one or more modifications to at least one of firmware and software for the one or more user devices from one or more vendor devices;
staging the one or more modifications in one or more servers;
identifying applicability of the one or more modifications to respective ones of the one or more user devices;
generating one or more virtual instances of respective ones of the one or more user devices based at least in part on the operational data and the identifying;
sending the one or more modifications to the one or more virtual instances from the one or more servers;
testing the one or more modifications on the one or more virtual instances to determine if there are one or more issues with the one or more modifications;
pushing, in response to a determination that the one or more issues with the one or more modifications are absent, the one or more modifications to the one or more user devices; and
generating, in response to a determination that the one or more issues with the one or more modifications are present, a notification for the one or more user devices at least one of indicating the presence of the one or more issues with the one or more modifications and specifying one or more available dependencies for removing the one or more issues;
wherein the steps of the method are executed by at least one processing device operatively coupled to at least one memory.

2. The method of claim 1 wherein the operational data comprises at least one of hardware configuration data, software configuration data and firmware configuration data.

3. The method of claim 1 wherein the identifying of the applicability of the one or more modifications to the respective ones of the one or more user devices is based, at least in part, on the operational data.

4. The method of claim 1 wherein the testing of the one or more modifications comprises executing an installation operation of the one or more modifications on the one or more virtual instances.

5. The method of claim 4 wherein the testing of the one or more modifications further comprises determining whether the installation operation of the one or more modifications on the one or more virtual instances is able to be completed.

6. The method of claim 4 wherein the testing of the one or more modifications further comprises analyzing one or more performance parameters of the one or more virtual instances at least one of during and following the execution of the installation operation.

7. The method of claim 6 wherein the one or more performance parameters correspond to at least one of objective relational mapping, full boot operations, fast startup operations, file handling operations and memory footprint operations.

8. The method of claim 4 wherein the one or more issues comprise at least one of: (i) a missing driver from the one or more virtual instances; (ii) incorrect installation of a driver on the one or more virtual instances; (iii) a full system failure of the one or more virtual instances at least one of during and following the execution of the installation operation; and (iv) an increase in application crashes on the one or more virtual instances at least one of during and following the execution of the installation operation.

9. The method of claim 4 further comprising collecting one or more logs of the execution of the installation operation.

10. The method of claim 9 further comprising transmitting the one or more logs to suppliers of the one or more modifications via the one or more vendor devices.

11. The method of claim 1 further comprising:
generating one or more reports of the testing; and
analyzing the one or more reports using one or more machine learning algorithms to classify the one or more issues.

12. The method of claim 11 further comprising generating a ranking of a plurality of different classified issues from repeated instances of the testing of a plurality of the modifications on a plurality of the virtual instances, wherein the ranking is based on a frequency of occurrence of the respective ones of the different classified issues.

13. The method of claim 12 wherein operations for the testing are prioritized to test for higher frequency classified issues before lower frequency classified issues.

14. The method of claim 1, further comprising deactivating the one or more virtual instances is response to completion of the testing.

15. An apparatus comprising:
a processing device operatively coupled to a memory and configured:
to collect operational data from one or more user devices;
to receive one or more modifications to at least one of firmware and software for the one or more user devices from one or more vendor devices;
to stage the one or more modifications in one or more servers;
to identify applicability of the one or more modifications to respective ones of the one or more user devices;
to generate one or more virtual instances of respective ones of the one or more user devices based at least in part on the operational data and the identifying;
to send the one or more modifications to the one or more virtual instances from the one or more servers;
to test the one or more modifications on the one or more virtual instances to determine if there are one or more issues with the one or more modifications;
to push, in response to a determination that the one or more issues with the one or more modifications are absent, the one or more modifications to the one or more user devices; and
to generate, in response to a determination that the one or more issues with the one or more modifications are present, a notification for the one or more user devices at least one of indicating the presence of the one or more issues with the one or more modifications and specifying one or more available dependencies for removing the one or more issues.

16. The apparatus of claim 15 wherein, in testing the one or more modifications, the processing device is configured to execute an installation operation of the one or more modifications on the one or more virtual instances.

17. The apparatus of claim 16 wherein, in testing the one or more modifications, the processing device is further configured to determine whether the installation operation of the one or more modifications on the one or more virtual instances is able to be completed.

18. An article of manufacture comprising a non-transitory processor-readable storage medium having stored therein program code of one or more software programs, wherein the program code when executed by at least one processing device causes said at least one processing device to perform the steps of:

collecting operational data from one or more user devices;

receiving one or more modifications to at least one of firmware and software for the one or more user devices from one or more vendor devices;

staging the one or more modifications in one or more servers;

identifying applicability of the one or more modifications to respective ones of the one or more user devices;

generating one or more virtual instances of respective ones of the one or more user devices based at least in part on the operational data and the identifying;

sending the one or more modifications to the one or more virtual instances from the one or more servers;

testing the one or more modifications on the one or more virtual instances to determine if there are one or more issues with the one or more modifications;

pushing, in response to a determination that the one or more issues with the one or more modifications are absent, the one or more modifications to the one or more user devices; and     generating, in response to a determination that the one or more issues with the one or more modifications are present, a notification for the one or more user devices at least one of indicating the presence of the one or more issues with the one or more modifications and specifying one or more available dependencies for removing the one or more issues.

19. The article of manufacture of claim 18 wherein, in testing the one or more modifications, the program code causes said at least one processing device to execute an installation operation of the one or more modifications on the one or more virtual instances.

20. The article of manufacture of claim 19 wherein, in testing the one or more modifications, the program code further causes said at least one processing device to determine whether the installation operation of the one or more modifications on the one or more virtual instances is able to be completed.

\* \* \* \* \*